United States Patent [19]

Mizushima et al.

[11] Patent Number: 4,843,432

[45] Date of Patent: Jun. 27, 1989

[54] IMAGE RECORDING APPARATUS

[75] Inventors: Toshiaki Mizushima, Kawasaki; Shigeo Ozaki, Chigasaki; Yukimasa Shinohara, Funabashi; Tomoo Tsunenari, Tokyo; Yasufumi Takada; Yasuo Noguchi, both of Yokohama, all of Japan

[73] Assignee: Canon Kabushiki Kaisha, Tokyo, Japan

[21] Appl. No.: 1,220

[22] Filed: Jan. 7, 1987

[30] Foreign Application Priority Data

| Jan. 13, 1986 | [JP] | Japan | 61-4696 |
| Jan. 13, 1986 | [JP] | Japan | 61-4697 |
| Jan. 14, 1986 | [JP] | Japan | 61-5782 |
| Jan. 14, 1986 | [JP] | Japan | 61-5783 |
| Jan. 21, 1986 | [JP] | Japan | 61-10694 |

[51] Int. Cl.$^4$ .................................................. G03B 27/52
[52] U.S. Cl. ........................................ 355/41; 271/294
[58] Field of Search ................. 355/41, 40; 271/294

[56] References Cited

U.S. PATENT DOCUMENTS

| 2,594,358 | 4/1952 | Shaw | 355/41 |
| 3,290,987 | 12/1966 | James et al. | 355/41 |
| 3,881,820 | 5/1975 | Muir | 355/41 |
| 4,248,529 | 2/1981 | Sato et al. | 355/41 |
| 4,264,196 | 4/1981 | Von Stein et al. | 355/41 |
| 4,449,812 | 5/1984 | Furuichi et al. | 271/294 |
| 4,457,008 | 6/1984 | Nakatana et al. | 355/41 |
| 4,466,608 | 8/1984 | Dubois et al. | 271/294 |
| 4,607,950 | 8/1986 | Ishii et al. | 355/41 |
| 4,693,591 | 9/1987 | Saijo et al. | 355/41 |

FOREIGN PATENT DOCUMENTS

122567 9/1979 Japan.

Primary Examiner—Monroe H. Hayes
Attorney, Agent, or Firm—Fitzpatrick, Cella, Harper & Scinto

[57] ABSTRACT

An image recording apparatus of this invention includes a microfilm feeder for moving images on a microfilm to a read position; a printer section for forming an image on the microfilm located at the read position on a sheet; a plurality of bin trays for stacking the sheets delivered from the printer section; a sorter for distributing the sheets delivered from the printer section to the bin trays; a case mark detector for detecting a case mark formed in correspondence with a specific one of images of each case on the microfilm; and a CPU for controlling the sorter in accordance with an output from the case mark detector so that different bin trays hold the sheets, on which images of each objective case are formed, in units of cases; and an input unit for inputting a copy set number. The CPU also controls the printer section so as to repeat an operation for sequentially recording the images of each objective case in a predetermined order in units of sets.

7 Claims, 7 Drawing Sheets

IMAGE RECORDING APPARATUS

BACKGROUND OF THE INVENTION

1. Field of the Invention

The present invention relates to an image recording apparatus such as a copying machine, a printer, and the like for recording an image formed on an image carrier on a sheet.

2. Related Background Art

Conventionally, for example, a patent specification is photographed on a microfilm, and this microfilm is copied as an original. The microfilm records images of a large number of cases of patent specifications in the order of pages in each frame. When the microfilm is set on a copying machine and a plurality of cases of patent specifications are copied to prepare a plurality of sets for each case, copies (copied sheets) of the respective cases are delivered onto an identical tray and are stacked on each other. When these copies are sorted for each case, a division between adjacent cases must be detected to classify them, resulting in cumbersome and time-consuming operations. In particular, when images of a plurality of cases, each consisting of a plurality of frames, are copied to prepare a plurality of sets for each case, after copying, copies must be sorted for each case, and then copies of each case must be sorted in the order of pages. Thereafter, various arrangements (stapling, printing reference numbers, and the like) must be performed, thus making post-copying operations cumbersome.

SUMMARY OF THE INVENTION

It is an object of the present invention to solve the above problem.

It is another object of the present invention to provide an image recording apparatus which stacks sheets recording images of desired cases while sorting them.

It is still another object of the present invention to provide an image recording apparatus which can efficiently and easily perform sheet arrangements after a recording operation.

It is still another object of the present invention to provide an image recording apparatus which automatically copies images of desired cases, and stacks a given number of sets of sheets corresponding to the respective cases in separate storing bins.

It is still another object of the present invention to provide an image recording apparatus which automatically copies images of desired cases, stacks sheets corresponding to the respective cases in each in an identical storing bin, and stacks a given number of combined sets of sheets of the cases in separate storage bins.

DETAILED DESCRIPTION OF THE PREFERRED EMBODIMENTS

Figure 1:
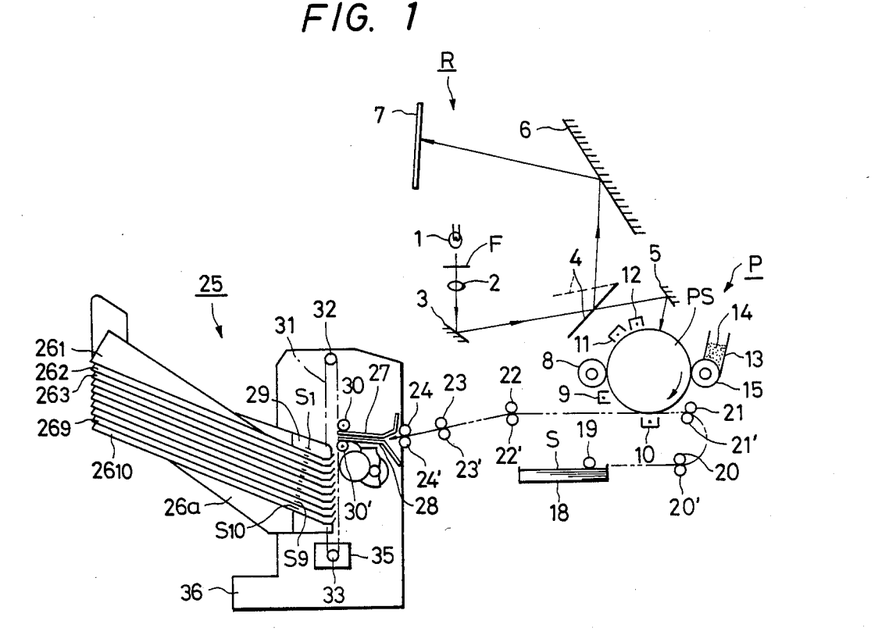
FIG. 1 is a view showing the entire arrangement of a film reader printer to which the present invention is applied.

FIG. 1 shows a reader printer as an image recording apparatus of the present invention, which has a reader section R and a printer section P. The printer shown in FIG. 1 includes a microfilm F, a light source (lamp) 1 for irradiating the microfilm F with light, a lens 2 for enlarging and projecting the microfilm F, a first mirror 3, a second mirror 4 for switching the optical path, a third mirror 5, a fourth mirror 6, a transmission-type screen 7, an electrophotographic photosensitive body PS which is axially supported to be rotatable in a direction indicated by the associated arrow in FIG. 1, a cleaner 8 for cleaning residual toner on the photosensitive body, a discharger 9, a transfer charger 10, a primary charger 11, a secondary charger 12, a developer 13, powder toner 14, a developing sleeve 15, a sheet-feed cassette 18, transfer sheets (copying sheets) S, a feed roller 19 for feeding a transfer sheet S from the sheet-feed cassette 18, convey rollers 20, 20', 21, 21', 22, 22', 23, 23', 24, and 24' for conveying the transfer sheet S, and a transfer sheet sorter (to be referred to simply as a sorter hereinafter) 25 for sorting and stacking the transfer sheets S conveyed from the printer section P.

The sorter 25 has a plurality of stages of bin trays $26_1$, $26_2$, $26_3$ to $26_{10}$, and is arranged at a sheet delivery section of the printer section P so that sheet convey guides 27 and 28 are aligned with the convey rollers 24 and 24'. Each of the bin trays $26_1$ to $26_{10}$ is mounted on a tray supporting plate 26a at one end.

The tray supporting plate 26a is mounted on a lift member 29. When the lift member 29 is moved vertically, the bin trays $26_1$ to $26_{10}$ can be moved vertically, so that a sheet entrance of a desired bin tray can be set at a position facing convey rollers 30 and 30'.

The lift member 29 is vertically movable along a supporting table 36, and the upper end of the lift member 29 is fixed to one end of a chain (or wire) 31. The chain 31 extends to a sprocket 33 coupled to a motor 35 via an idler sprocket 32, and the other end of the chain 31 is fixed to the lower end of the lift member 29 via a spring (not shown).

Therefore, when the motor 35 is driven to rotate the sprocket 33 clockwise in FIG. 1, the bin trays $26_1$ to $26_{10}$ are moved upward together with the lift member 29. When the sprocket 33 is rotated counterclockwise, the bin trays can be moved downward.

In the sorter 25, an uppermost vacant bin tray of vacant bin trays in which no transfer sheets are stored is located at a home position for receiving the transfer sheets S. More specifically, the transfer sheets can be transferred to a bin tray located at the home position.

In FIG. 1, since all the bin trays $26_1$ to $26_{10}$ are vacant, the sheet entrance of the first bin tray $26_1$ faces the convey rollers 30 and 30'. In this state, when a transfer sheet S is delivered by the convey rollers 24 and 24' at the delivery section of the printer section P, it is guided by the convey guides 27 and 28 and is fed into the first bin tray $26_1$ by the convey rollers 30 and 30'.

After the transfer sheets S are conveyed and stored in the first bin tray $26_1$, when a sorter drive signal SDS (to be described later) is supplied to the sorter 25, the motor 35 coupled to the sprocket 33 is rotated in response thereto, and the lift member 29 is moved upward.

Upon upward movement of the lift member 29, the bin trays are moved upward. When the sheet entrance of the second bin tray $26_2$ reaches a position facing the sheet delivery port of the convey rollers 30 and 30', that is, when the second bin tray $26_2$ is located at the home position, the motor 35 is stopped and the upward movement of the lift member 29 is stopped. More specifically, upon reception of the sorter drive signal SDS, the bin trays are moved upward by one stage in the sorter 25.

In this state, when the next transfer sheet S is transferred by the convey rollers 24 and 24', the sheet S is conveyed and stored in the second bin tray $26_2$.

In this manner, each time the sorter drive signal SDS is input, the bin trays $26_1$ to $26_{10}$ are moved upward by one stage, so that the transfer sheets are conveyed and stored in the respective trays $26_1$ to $26_{10}$.

Note that the sorter 25 is not limited to that described in this embodiment, and various other known sorters can be used. Transfer sheet detectors $S_1$ to $S_{10}$ which detect the presence/absence of the transfer sheet S and comprise microswitches or photointerrupters are respectively arranged on the bin trays $26_1$ to $26_{10}$. When each transfer sheet detector detects no transfer sheet, a sheet nontransfer signal SNS indicating that the bin tray with the corresponding bin tray is vacant is generated.

In FIG. 1, when a power source switch (not shown) is turned on, the lamp 1 is turned on. When a desired frame of the microfilm F is set at a predetermined position, an image recorded on the frame placed at the predetermined position is enlarged by the lens 2, and the frame image is projected onto the screen 7 by the first mirror 3, the second mirror 4, which is switched at a reader mode position, and the fourth mirror 6.

When this frame image is copied, the photosensitive body PS, the developing sleeve 15, the cleaner 8, and the convey rollers 20, 20', 21, 21', 22, 22', 23, 23', 24, 24', 30, and 30' begin to rotate. The chargers 9, 10, 11, and 12 are energized to form a charge on the surface of the photosensitive body PS.

When the operation mode is switched from the reader mode to a printer mode, the second mirror 4 is popped up to a broken-line position, so that light reflected by the first mirror 3 reaches the third mirror 5 and is then projected onto the photosensitive body PS by the third mirror 5, thus forming a latent image.

Since the microfilm F is driven at a speed corresponding to (a peripheral speed of the photosensitive body PS)/(an enlargement magnification of the lens 2), the microfilm F and the photosensitive body PS are synchronized with each other. Therefore, a latent image formed on the photosensitive body PS is not subjected to image drift.

The latent image formed on the photosensitive body PS is developed by the toner 14 attached to the surface of the developing sleeve 15 at a developing position facing the sleeve 15 arranged in the developer 13.

Before the developed surface of the photosensitive body PS reaches the transfer charger 10, the transfer sheet S stored in the cassette 18 is fed by the feed roller 19, and is conveyed by the convey rollers 20, 20', 21, and 21' to be moved at a timing coinciding with the developed portion on the photosensitive body PS.

The transfer sheet S on which the developed image is transferred from the photosensitive body PS is separated from the photosensitive body PS, and is conveyed by the convey rollers 22, 22', 23, 23', 24, and 24' which also serve as a fixing device.

The frame images of the microfilm can be scanned by an image sensor, e.g., a CCD, and can be converted to an image signal. With this image signal, copies can be obtained by a laser beam printer or an ink-jet printer.

Figure 2:
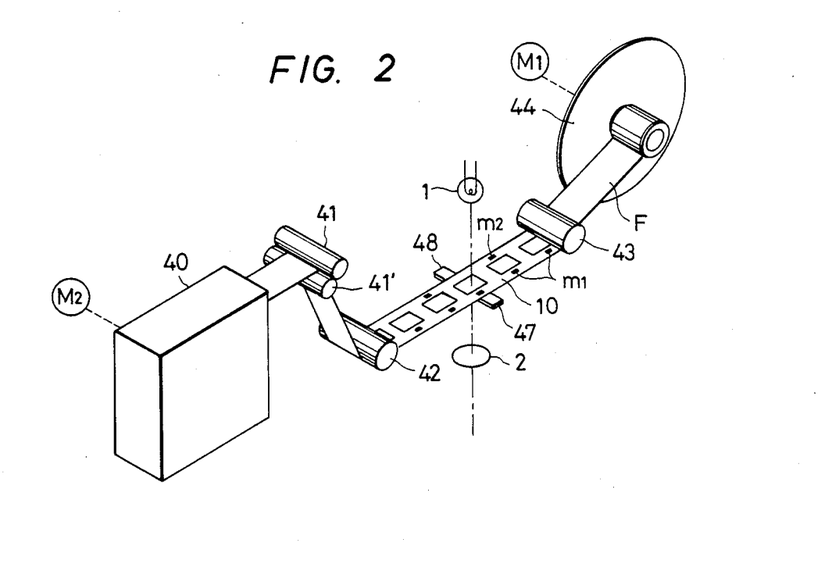
FIG. 2 is a perspective view of a film feeder.

FIG. 2 shows a feeder of the microfilm F. The microfilm F fed from a microfilm cartridge 40 mounted at a predetermined position passes between auto-loading rollers 41 and 41', is fed in the horizontal direction between two guide rollers 42 and 43, and is then taken up by a takeup reel 44.

The takeup reel 44 and a reel in the cartridge 40 are coupled to motors $M_1$ and $M_2$, respectively. When the microfilm F is fed in a forward direction (to the right as viewed in FIG. 2), the motor $M_1$ coupled to the reel 44 is driven. When the microfilm F is fed backward, the motor $M_2$ coupled to the reel in the cartridge 40 is driven.

Figure 3:
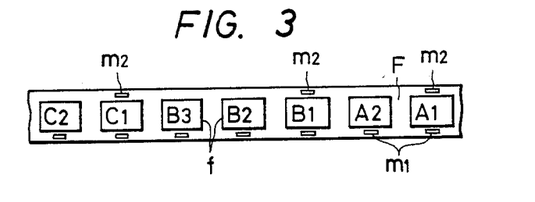
FIG. 3 is a front view of a microfilm.

On the microfilm F, as shown in FIG. 3, images are recorded on respective frames f aligned in a line. A frame mark $m_1$ is formed on one side edge portion of the microfilm F in correspondence with each frame f. A case mark $m_2$ for identifying a case is formed on the other side edge portion of the microfilm F in correspondence with the starting frame $A_1$ or $B_1$ of a frame group for one case, e.g., $A_1$ and $A_2$, or $B_1$, $B_2$, and $B_3$, which record a group of images having associated information contents. Images are recorded on the frame group for each case in the order of pages from the starting frame. The microfilm F has its distal end on the right side in FIG. 3, and is fed to the takeup reel 44 from its distal end.

Referring to FIG. 2, a frame mark detector for detecting the frame mark $m_1$ corresponding to a frame of the microfilm F located on the copying optical axis, and a case mark detector 48 for detecting the case mark $m_2$ at the copying position are arranged on an illumination area of the lamp 1.

The respective mark detectors 47 and 48 are connected to a retrieval and copy control circuit (to be described later). The mark detectors each have light-receiving elements, and generate a mark detection signal upon detection of a mark.

Figure 4:
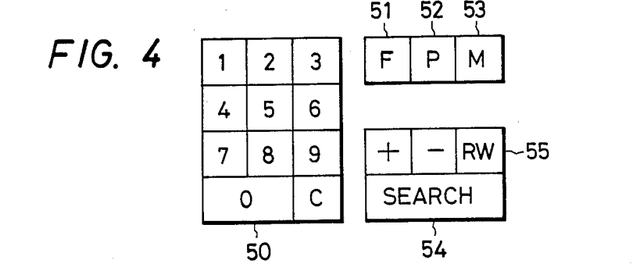
FIG. 4 is a front view of an operation panel.

FIG. 4 shows an operation panel, which includes ten keys 50, a case mode instruction key 51, a print key 52, a memory key 53, a search key 54, and a rewind key 55.

When the image of a desired case is retrieved, a case number of the desired case is input by the ten keys 50, and then the case mode instruction key 51 and the search key 54 are depressed.

When the image is retrieved and a plurality of sets of copies thereof are to be prepared, after the keys 50 and 51 are depressed, the ten keys 50 corresponding to the number of sets of copies, the print key 52, and the search key 54 are depressed in the order mentioned.

When a plurality of cases are retrieved and a plurality of sets of copies of each case are to be prepared, the case number of a desired first case is input by the ten keys 50, and then the case mode instruction key 51, the ten keys 50 corresponding to the number of sets of copies of this case and the memory key 53 are depressed in the order mentioned. Then the case number of a desired second case is input by the ten keys 50, and the case mode instruction key 51, the ten keys 50 corresponding to the number of sets of copies of this case, and the memory key 53 are depressed in the order mentioned. After the same operations are repeated for the respective cases, the print key 52 and the search key 54 can be depressed finally.

Figure 5:
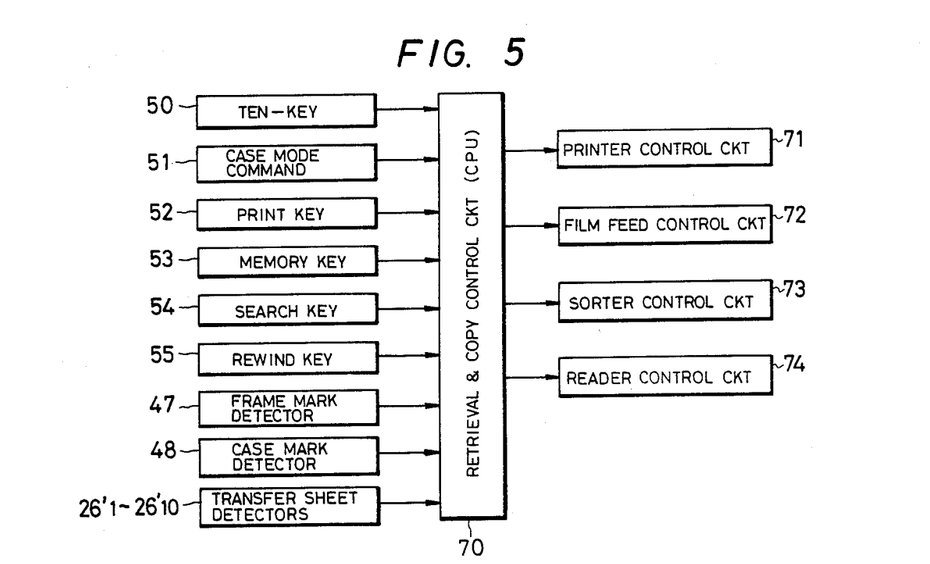
FIG. 5 is a block diagram showing the relationship between a retrieval and copy control circuit and an input/output device.

FIG. 5 is the block diagram showing the relationship between a retrieval and copy control circuit 70 for supplying a control signal to the reader section R, the printer section P, and the sorter 25, and its input/output device.

The retrieval and copy control circuit (to be referred to as a CPU hereinafter) 70 comprises a microcomputer which incorporates a central processing unit, a ROM as a program memory, and a RAM as a data memory.

A frame mark counter for counting frame mark detection signal output from the frame mark detector 47 upon detection of the frame mark $m_1$, a case mark counter for counting case mark detection signal output from the case mark detector 48 upon detection of the case mark $m_2$, a data storage for storing the case or frame number of an image to be searched and the number of sets of copies of each image input by the ten keys 50, and the like are allocated in the RAM in the CPU 70.

Input ports of the CPU 70 receive signals from the operation keys 50 to 55 on the operation panel shown in FIG. 4, signals from the mark detectors 47 and 48, and signals from transfer sheet detectors S1 to S10 for detecting the presence/absence of the transfer sheet in the respective bin trays. The detectors S1 to S10 are arranged on the respective bin trays, and each comprise microswitches or photocoupler.

Output ports of the CPU 70 are connected to a printer control circuit 71 for controlling the copying operation of the printer section P, a film feed control circuit 72 for controlling the film feed operation of the film feeder, a sorter control circuit 73 for controlling the operation of the sorter 25, and a reader control circuit 74 for controlling the operation of the reader section R. The control circuits 71 to 74 operate the respective sections in accordance with a signal output from the CPU 70.

Figure 6:
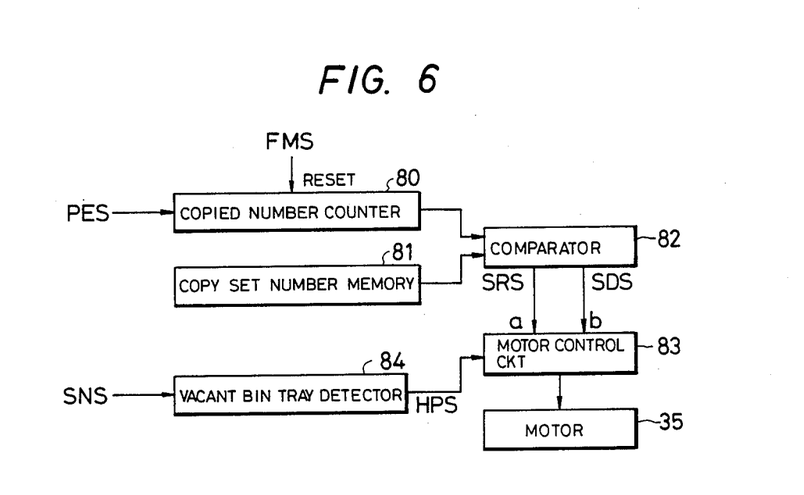
FIG. 6 is a block diagram of a circuit for controlling a sorter.

FIG. 6 is a block diagram of a circuit for controlling the sorter 25. The circuit shown in FIG. 6 includes a copies number counter 80 for counting the copied number of times of a frame, and a copy set number memory 81 for storing the number of sets of copies input by the ten keys 50 of the operation panel. The counter 80 and the memory 81 are allocated in the RAM or the CPU 70.

When the counter 80 receives a copy end signal PES, it adds and counts the signal PES, and when it receives a case mark detection signal FMS, it is reset to "0".

A comparator 82 compares the contents of the counter 80 and the memory 81. When a coincidence is found therebetween, the comparator 82 outputs a sorter return signal SRS from its terminal a, and when no coincidence is found therebetween, outputs a sorter drive signal SDS from a terminal b. More specifically, when the counter 80 counts the copy end signal PES, the comparator 82 compares the contents of the counter 80 and the memory 81 and outputs a signal from the terminal a or b in accordance with the comparison result. The copy end signal PES is generated each time a single copying operation is completed, and is preferably generated when the transfer sheet S is conveyed to the bin tray.

When a motor control circuit 83 receives the sorter return signal SRS, it drives the motor 35, so that the uppermost bin tray of the sorter 25 is moved to the home position at the beginning of the copying operation. When the control circuit 83 receives the sorter drive signal SDS, it drives the motor 35 so as to move up the bin trays $26_1$ to $26_{10}$ of the sorter 25 by one stage, so that the bin tray one stage below the one storing the previously copied transfer sheet S will receive and store the next sheet S.

A vacant bin tray detector 84 receives the sheet non-transfer signal SNS to detect the position of an uppermost vacant bin tray of vacant bin trays. The detector 84 discriminates the uppermost vacant bin tray from the outputs from the transfer sheet detectors S1 to S10, and outputs a home position signal HPS for moving the detected uppermost vacant bin tray to the home position, so that the sheet entrance of the corresponding bin tray faces the convey rollers 30 and 30'.

Figure 7:
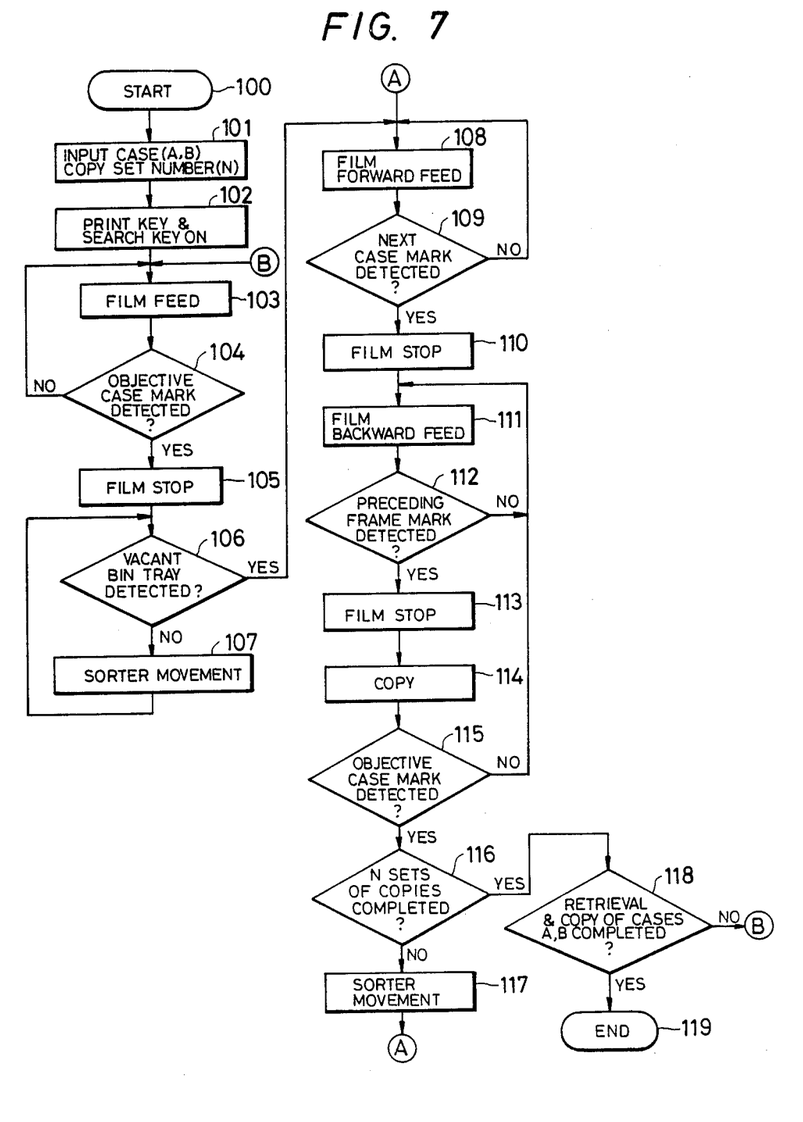
FIG. 7 is a flow chart for explaining the operation.

The operation of the CPU 70 shown in FIG. 5 will now be described with reference to the flow chart shown in FIG. 7.

A case will be described wherein N sets each of a plurality of cases of images are copied. Assume that two sets of a case consisting of frames $A_1$ and $A_2$ (a case number A) and two sets of a case consisting of $B_1$, $B_2$, and $B_3$ (a case number B) shown in FIG. 3 are to be copied. After control is started in step 100, the case numbers A and B are input from the operation panel with the predetermined procedures in step 101, and "2" is input as the copy set number N. Then, when the print key 52 and the search key 54 are depressed in step 102, the input data A, B, and N are stored in the RAM of the CPU 70. In step 103, a count (X) of the case mark counter, i.e., a case number X of a currently searched image is compared with the initially input case number A by the comparator to calculate $A - X = Y$, and the microfilm F is fed forward or backward in accordance with the sign of Y.

When the case mark detector 48 detects the case mark of the case number A, i.e., the case mark $m_2$ of the frame $A_1$, the count of the case mark counter coincides with the case number A (step 104), and a coincidence signal is generated from the comparator, thus stopping the microfilm F (step 105). At this time, the frame $A_1$ is located at the copying position.

The flow then advances to step 106 to detect a vacant bin tray and to check if the sheet entrance of the uppermost vacant bin tray faces the convey rollers 30 and 30'. If the sheet entrance does not face the rollers 30 and 30', the home position signal HPS is generated from the vacant bin tray detector 84 shown in FIG. 6 so as to move the uppermost vacant bin tray, i.e., the first bin tray $26_1$ to the home position. More specifically, all the bin trays $26_1$ to $26_{10}$ are located at lower positions shown in FIG. 1.

When the first bin tray $26_1$ is located at the home position, the flow advances to step 108, and the microfilm F is fed forward. When the case mark detector 48 detects the next case mark, i.e., the case mark $m_2$ of the starting frame $B_1$ of the next case closest to the last frame $A_2$ in step 109, the microfilm F is stopped (step 110).

The microfilm F is fed backward (step 111). When the frame mark detector 47 detects the frame mark $m_1$ of the last frame $A_2$ of the desired case (step 112), the microfilm is stopped (step 113). At this time, the frame $A_2$ is located at the copying position.

In step 114, the frame $A_2$ is copied, and the transfer sheet S having an image of the frame $A_2$ is conveyed to the first bin tray $26_1$. After this copying operation is completed, the flow advances to step 115, and the operations of steps 111 to 115 are repeated until the case mark is detected, thus copying the frames $A_2$ and $A_1$.

When it is confirmed that the copying operation for the respective frames of one case is completed (step 115), the copy end signal PES is supplied to the counter 80 shown in FIG. 6, and is counted thereby. At this time, the content ("1") of the counter 80 and the content (corresponding to N=2) of the memory 81 are compared by the comparator 82 (step 116). If no coincidence is found therebetween, the sorter drive signal SDS output from the terminal b of the comparator 82 is supplied to the motor 35 of the sorter 25, and the bin trays are moved upward by one stage in step 117, thereby locating the second bin tray $26_2$ at the home position. The operation of steps 108 to 115 are repeated, and the transfer sheets having copied images of the frames $A_1$ and $A_2$ are sequentially transferred to the second bin tray $26_2$.

When the second copying operation of the frames of the case number A is completed, the content ("2") of the counter 80 and the content of the memory 81 coincide with each other in step 116, and the flow advances to step 118.

It is checked in step 118 if the retrieval and copying operations with respect to the input data A and B stored in the RAM of the CPU 70 are completed. If the retrieval and copying operations are completed, the entire operation is ended.

If it is detected in step 118 that the retrieval and copying operations of the image of the case number B are not completed, the flow returns to step 103, and the same operations as described above in steps 103 to 122 are performed. In step 103, B−A=Y is calculated by the comparator, and the microfilm is fed in a predetermined direction in accordance with the calculation result. When the case mark detector 48 detects the case mark of the desired case number B, i.e., the case mark $m_2$ of the frame $B_1$ in step 104, the content of the case mark counter coincides with the case number B, and a coincidence signal is generated from the comparator, thus stopping the microfilm F (step 105). At this time, the frame $B_1$ is located at the copying position.

In step 106, a vacant bin tray is detected. If the sheet entrance of the uppermost vacant bin tray does not face the convey rollers 30 and 30', the flow advances to step 107, and the sorter is moved so that the sheet entrance of the uppermost vacant bin tray faces the convey rollers 30 and 30'. More specifically, when the sorter 25 terminates its movement, the vacant third bin tray $26_3$ is located at the home position so that its sheet entrance faces the convey rollers 30 and 30'.

In step 108, the microfilm F is fed forward. When the case mark detector 48 detects the case mark of the next case closest to the last frame $B_3$ of the desired case, i.e., the case mark $m_2$ of the frame $C_1$, the microfilm is stopped (step 109). The microfilm is fed backward (step 111). When the frame mark detector 47 detects the frame mark $m_1$ of the last frame $B_3$ (step 112), the microfilm is stopped (step 113), and the frame $B_3$ is copied (step 114).

The transfer sheet S having a copied image of the frame $B_3$ is transferred and stored in the third bin tray $26_3$. Thereafter, the operation of steps 111 to 115 are repeated until the case mark is detected, and the transfer sheets copying the frames $B_2$ and $B_1$ is transferred to the third bin tray $26_3$.

When it is confirmed that the copying operation of one case is completed (step 115), the copying end signal PES is supplied to the counter 80 shown in FIG. 6 and is counted thereby. At this time, the content ("1") of the counter 80 and the content of the memory 81 (storing N=2) are compared by the comparator 82 (step 116). When no coincidence is found therebetween, the sorter drive signal SDS output from the terminal b of the comparator 82 is supplied to the motor 35 of the sorter 25, and the bin trays are moved upward by one stage in step 117, thereby locating the fourth bin tray $26_4$ at the home position. The operations of steps 108 to 115 are repeated, and the transfer sheets having copied images of the frames $B_3$, $B_2$, and $B_1$ are transferred to the fourth bin tray $26_4$. The copying operation is performed for the frames $B_3$, $B_2$, and $B_1$ each for a predetermined number of sets, and the third bin trays $26_3$ and $26_4$ store the transfer sheets having copied images of the frames $B_1$ to $B_3$ in the order of pages.

When the second copying operation for the frames of the case number B is completed, the content ("2") of the counter 80 coincides with the contents of the memory 81, and the flow advances to step 118.

When the retrieve and copying operations for the input data A and B are completed in step 118, the flow advances to step 119, and the retrieve and copying operations are completed. Thereafter, if the case number of a new case and an objective copy set number are input, the transfer sheets can be stacked on the vacant bin trays for each set of each case in the same manner as described above.

With the above operation, copied sheets shown in the table below are fed to and stacked in the first to fourth bin trays $26_1$ to $26_4$ in the order of (1) to (4).

| First Bin Tray $26_1$ | (1) | $A_1$ |
| | | $A_2$ |
| Second Bin Tray $26_2$ | (2) | $A_1$ |
| | | $A_2$ |
| Third Bin Tray $26_3$ | (3) | $B_1$ |
| | | $B_2$ |
| | | $B_3$ |
| Fourth Bin Tray $26_4$ | (4) | $B_1$ |
| | | $B_2$ |
| | | $B_3$ |

Note that the number of the bin trays is not limited to that in the above embodiment, but can be desirably increased.

Since the transfer sheets S conveyed from the printer section P are output to each bin tray in units of cases and sets (first set, second set, . . . , of the case A, first set, . . . of case B), after the copying operation is completed, the transfer sheets can be sequentially picked up from each bin tray and can be easily bound, resulting in efficient and easy arrangement after the copying operation.

Note that different copy set numbers for the respective cases can be input. When the uppermost bin tray is to be detected, no transfer sheet detectors need be provided to the bin trays, and bin trays on which the transfer sheets are placed can be discriminated by the CPU 70 to detect the uppermost vacant bin tray.

Figure 8:
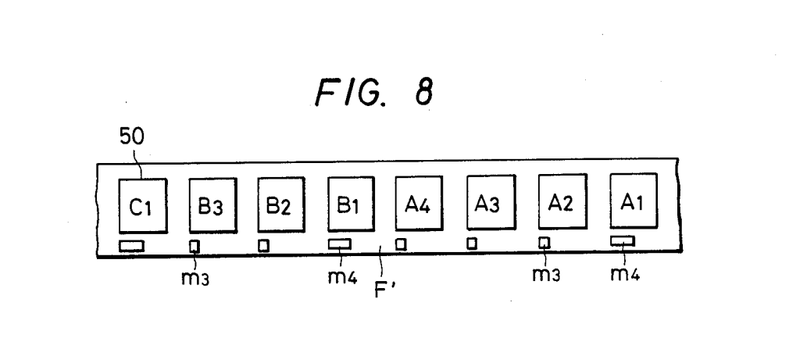
FIG. 8 is a front view showing another embodiment of a microfilm.

FIG. 8 shows another embodiment of the microfilm F. A large case mark $m_4$ for identifying each case is formed on the lower side portion of starting frames $A_1$ and $B_1$ of the frame groups $A_1$ to $A_4$ and $B_1$ to $B_3$ of the microfilm F recording unitary images, and small frame marks $m_3$ for identifying each frame are formed on the lower side portion of the other frames.

Alternatively, a microfilm with only frame marks can be used. In this case, addresses of a frame group of an objective case can be defined by the frame number of the starting frame and that of the last frame, and the frame group between the designated frame numbers can be retrieved to be copied.

In the above embodiment, since the transfer sheets S are stacked on the bin tray to face their toner image forming surfaces upward, the copying operation is started from the last frame of the objective case in order to sort the copies in the order of pages. However, when the transfer sheets are stacked on the bin tray to face their toner image forming surfaces downward, the copying operation can be started from the starting frame of the objective case.

With the above embodiment, images of an objective case can be automatically retrieved and recorded, and sheets recording the images of each case are stored on separate bin trays, resulting in easy arrangement after the recording operation.

Figure 9:
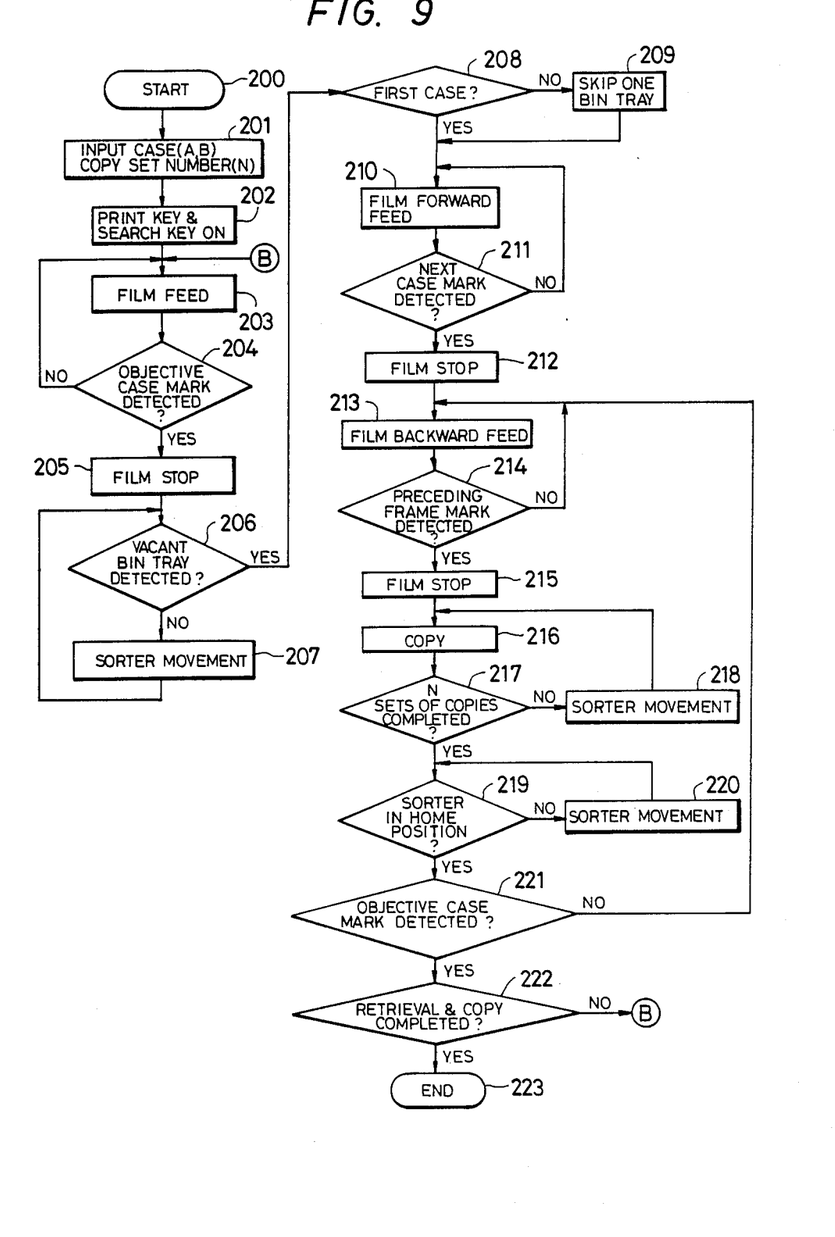
FIGS. 9 to 12 are flow charts for explaining the operation of another embodiment of the present invention.

FIG. 9 shows an operation flow according to another embodiment of the present invention.

Copied sheets on which images of an objective case are copied are transferred to separate bin trays for each case, and a bin tray between adjacent cases is rendered vacant. With this embodiment, a division of cases can be easily discriminated after the copying operation, and arrangements, e.g., bookbinding, can be efficiently and easily performed.

A case will be described wherein a plurality of pieces of case information are copied to prepare N sets of copies each. A case consisting of frames $A_1$ and $A_2$ and a case consisting of frames $B_1$, $B_2$, and $B_3$ shown in FIG. 3 are copied to prepare two sets of copies each. After control is started in step 200, case numbers A and B are input from the operation panel with predetermined procedures, and "2" is then input as a copy set number N. Then, when the print key 52 and the search key 54 are depressed in step 202, input data A, B, and N are stored in the RAM of the CPU 70. In step 203, a count (X) of the case mark counter, i.e., a case number X of currently retrieved information, is compared with the case number A by the comparator to calculate $A - X = Y$, and the microfilm F is moved forward or backward in accordance with the sign of Y.

When the case mark detector 48 detects the case mark of the case number A, i.e., the case mark $m_2$ of the frame $A_1$, the content of the case mark counter coincides with the case number A (step 204), and a coincidence signal is generated from the comparator to stop the microfilm F (step 205). At this time, the frame $A_1$ is located at the copying position.

The flow advances to step 206, and a vacant bin tray is detected to check if the sheet entrance of the uppermost vacant bin tray faces the convey rollers 30 and 30'. If the sheet entrance does not face the rollers 30 and 30', the home position signal HPS is generated from the vacant bin tray detector 84 shown in FIG. 6, so as to locate the uppermost vacant bin tray, i.e., the first bin tray $26_1$ at a home position in the sorter 25 (this state is referred to as a first home position hereinafter). More specifically, all the bin trays $26_1$ to $26_{10}$ are located at their lower positions shown in FIG. 1.

After the sorter 25 is located at the first home position, the flow advances to step 208. If the copying operation for the first case is being performed, the flow advances to step 210. If not, one bin tray is skipped in step 209.

This idea for skipping one bin tray is applied to the copying operation for the second case and thereafter.

If it is detected that an image of the case number A is an image copied for the first case, the flow advances to step 210 without being going through step 209. In step 210, the microfilm is fed forward. When the case mark detector 48 detects the next case mark, i.e., the case mark $m_2$ of the starting frame $B_1$ of the next case closest to the last frame $A_2$ of the objective case in step 211, the microfilm is stopped (step 212). Then, the microfilm is fed backward (step 213). When the frame mark detector 47 detects the frame mark, i.e., the frame mark $m_1$ of the last frame $A_2$ of the objective case (step 214), the microfilm is stopped (step 215). At this time, the frame $A_2$ is located at the copying position. In step 216, the copying operation for the information of the frame $A_2$ is performed, and the transfer sheet S copying the frame $A_2$ is conveyed to the first bin tray $26_1$. After this copying operation is completed, the flow advances to step 217.

When the first copying operation is completed, the copy end signal PES is supplied to the copied number counter 80 shown in FIG. 6, and is counted thereby. At this time, the content ("1") of the counter 80 is compared with the content of the copy set number memory 81 (storing N=2) by the comparator 82. If no coincidence is found therebetween, the sorter drive signal SDS output from the terminal b of the comparator 82 is supplied to the motor 35 of the sorter 25. Then, the bin trays are moved upward by one step in step 218, thereby locating the second bin tray $26_2$ at the home position.

The copying operation of the frame $A_2$ is again performed in step 216, and the transfer sheet S having a copied image of the frame $A_2$ is conveyed to the second bin tray $26_2$.

When the second copying operation of the frame $A_2$ is completed, the content ("2") of the counter 80 coincides with the content of the memory 81, and the flow advances to step 219. It is checked in step 219 to determine if the sorter 25 is returned to the first home position described above. If the sorter 25 is not returned to the first home position, the flow advances to step 220.

When the sorter 25 is not returned to the first home position, the sorter return signal SRS output from the terminal a of the comparator 82 shown in FIG. 6 is supplied to the motor 35 of the sorter 25, and the bin trays are moved downward, so that the bin trays are located at the first home position, i.e., a position at which the sheet entrance of the first bin tray $26_1$ on which the initially copied sheet is placed faces the convey rollers 30 and 30'.

When the sorter 25 returns to the first home position, the flow advances to step 221. It is checked in step 221 if the case mark detector 48 detects a case mark. If the detector 48 does not detect a case mark, the flow advances to step 213.

Upon completion of the copying operation of the frame $A_2$, since no case mark is detected, the microfilm is fed backward in step 213 after the copying operation of the frame $A_2$. When a frame mark is detected in step 214, the microfilm is stopped so that the frame $A_1$ is stopped at the copying position. Then, the information of the frame $A_1$ is copied, and the transfer sheet S having a copied image of the frame $A_1$ is conveyed to the first bin tray $26_1$.

When the first copying operation of the frame $A_1$ is completed, the second copying operation thereof is performed via steps 217 and 218 in the same manner as described above. With the second copying operation of the frame $A_1$, the transfer sheet S having a copied image of the frame $A_1$ is conveyed to the second bin tray $26_2$. After the second copying operation for the frame $A_1$ is completed, the sorter 25 is returned to the first home position in step 219.

The flow then advances to step 221. When the case mark detector 48 detects a case mark in step 221 (detects the case mark $m_2$ of the frame $A_1$), the flow advances to step 222 to determine. It is checked in step 222 if the retrieval and copying operations for the input data A and B stored in the RAM of the CPU 70 and the one-bin skipping operation are completed. If the retrieval and copying operations are not completed, the flow advances to step 203. Otherwise, the flow advances to step 223.

It is detected in step 222 that the retrieval and copying operations of the image of the case number B are not completed, and the flow advances to step 203. Thereafter, the same operations as described above in steps 203 to 224 are performed. More specifically, $B-A=Y$ is calculated by the comparator in step 203, and the microfilm is fed in a predetermined direction in accordance with the calculation result. In step 204, when the case mark detector 48 detects the case mark of the objective case number B, i.e., the case mark $m_2$ of the frame $B_1$, the content of the case mark counter coincides with the case number B, and a coincidence signal is generated from the comparator, thus stopping the microfilm (step 205). At this time, the frame $B_1$ is located at the copying position.

A vacant bin tray is detected in step 206. If the sheet entrance of the uppermost vacant bin tray does not face the convey rollers 30 and 30', the third bin tray $26_3$ is located at the home position in step 207, so that the sheet entrance of the uppermost vacant tray faces the convey rollers 30 and 30'. More specifically, the vacant third bin tray $26_3$ is located at a position at which its sheet entrance faces the convey rollers 30 and 30'.

The flow advances to step 208 to check if an image of the case number B is an image of the first case. Since the image of the case number B is to be copied for the second case, the flow advances to step 209, and the bin trays are moved upward by one stage, thereby locating the vacant fourth bin tray $26_4$ at the home position. (This state is referred to as a second home position.) The flow then advances to step 210. The microfilm is fed forward. When the case mark detector 48 detects the case mark of a case closest to the last frame $B_3$ of the objective case, i.e., the case mark $m_2$ of the frame $C_1$, the microfilm is stopped (step 212). Then, the microfilm is fed backward (step 213). When the frame mark detector 47 detects the frame mark $m_1$ of the frame $B_3$ (step 214), the microfilm is stopped (step 215), and the frame $B_3$ is copied (step 216).

The transfer sheet S having a copied image of the frame $B_3$ is conveyed to and stacked on the fourth bin tray $26_4$. The bin trays are moved upward by one stage (step 218), and the fifth bin tray $26_5$ is located at a position at which its sheet entrance faces the convey rollers 30 and 30'. Thereafter, the second copying operation of the frame $B_3$ is performed, and the transfer sheet S having a copied image of the frame $B_3$ is conveyed to and stacked on the fifth bin tray $26_5$. The sorter is returned to the second home position, and the fourth bin tray $26_4$ is located at a position at which its sheet entrance faces the convey rollers 30 and 30' (steps 219 and 220).

Thereafter, the copying operations corresponding to the objective copy set number are performed for the frames $B_2$ and $B_1$, and the transfer sheets having copied images of the frames $B_1$ to $B_3$ are respectively stacked on the fourth and fifth bin trays $26_4$ and $26_5$ in the order of pages.

If the retrieval and copying operations for the input data A and B are completed in step 222, the flow advances to step 223, thus completing the retrieval and copying operations. Thereafter, if a case number and an objective copy set number of a new case are input, the transfer sheets can be stacked on the vacant bin trays in units of cases and sets in the same manner as described above.

With the above operation, copied sheets are stacked on the first to fifth bin trays $26_1$ to $26_5$ of the sorter 25 as shown in the table below.

| | |
|---|---|
| First Bin Tray $26_1$ | $A_1$ |
| | $A_2$ |
| Second Bin Tray $26_2$ | $A_1$ |
| | $A_2$ |
| Third Bin Tray $26_3$ | Vacant |
| Fourth Bin Tray $26_4$ | $B_1$ |
| | $B_2$ |
| | $B_3$ |
| Fifth Bin Tray $26_5$ | $B_1$ |
| | $B_2$ |
| | $B_3$ |

According the embodiment as described above, images of a plurality of cases on a microfilm can be automatically retrieved and copied, and copies of the respective cases are stored on separate bin trays, resulting in easy arrangement after the copying operation. If transfer sheets on a bin tray above a vacant bin tray are picked up, a set (sets) of an urgent case can be rapidly obtained.

Figure 10:
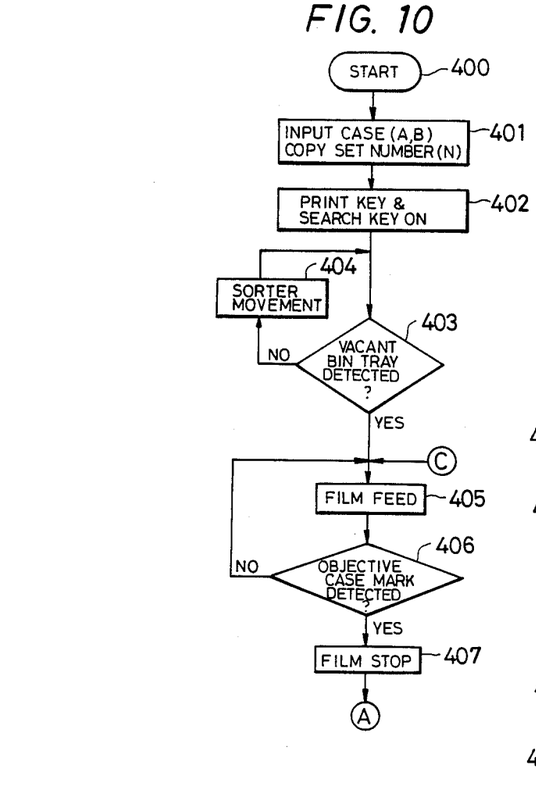
Figure 11:
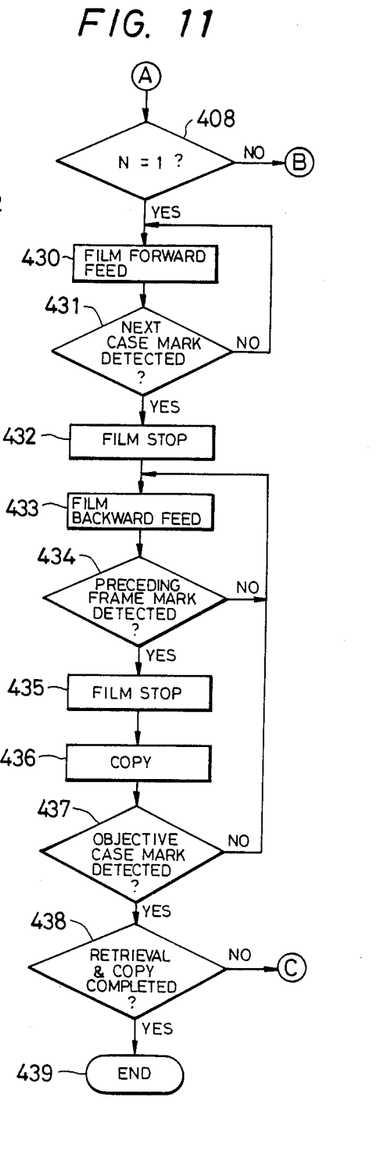
Figure 12:
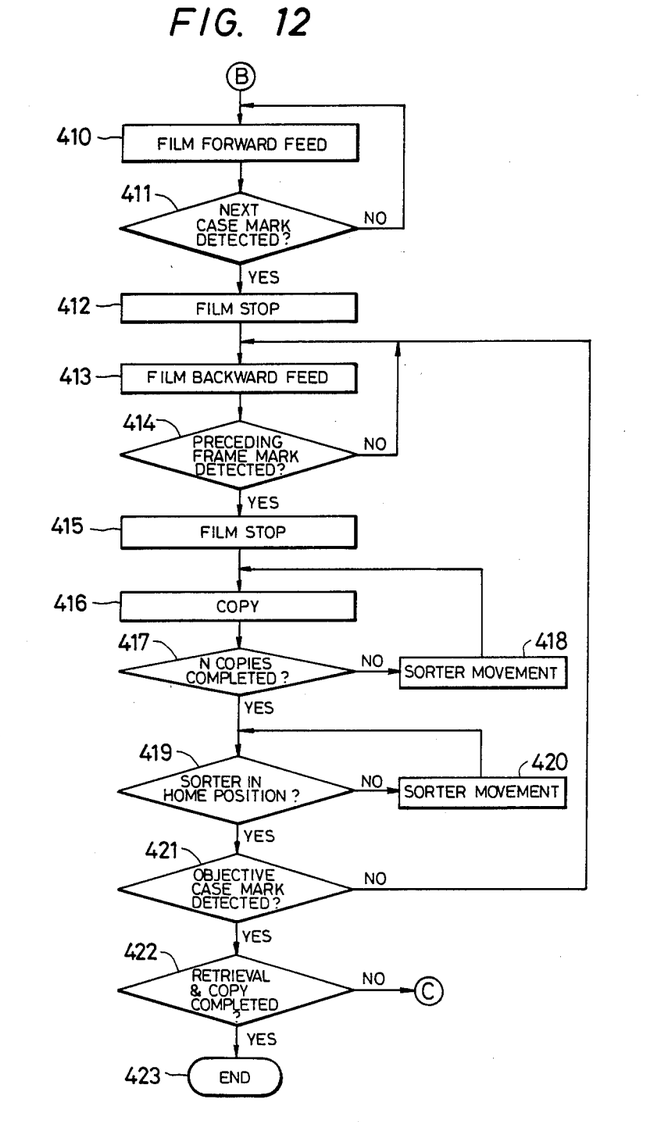

FIGS. 10 to 12 show operation flows according to still another embodiment of the present invention.

A case will be described wherein a plurality of cases of images are copied to prepare N sets of copies each. A case consisting of the frames $A_1$ and $A_2$ (case number A) and a case consisting of the frames $B_1$, $B_2$, and $B_3$ are copied to prepare two sets of copies each. In step 401, the case numbers A and B are input from the operation panel with predetermined procedures, and "2" is then input as a copy set number N. Then, when the print key 52 and the search key 54 are depressed in step 402, the input data A, B, and N are stored in the RAM of the CPU 70.

The flow advances to step 403 and a vacant bin tray is detected to check if the sheet entrance of the uppermost vacant bin tray faces the convey rollers 30 and 30'. If the sheet entrance does not face the rollers 30 and 30', the home position signal HPS is generated from the vacant bin tray detector 84 shown in FIG. 6, so that the uppermost bin tray, i.e., the first bin tray $26_1$ is located at a home position in the sorter 25 (this state is referred to as a third home position hereinafter). More specifically, all the bin trays $26_1$ to $26_{10}$ are located at their lower positions shown in FIG. 1.

When the sorter is located at the third home position, a count (X) of the case mark counter, i.e., a case number X of a currently retrieved image is compared with the initially input case number A by the comparator to calculate $A-X=Y$, and the microfilm F is moved forward or backward in accordance with the sign of Y.

When the case mark detector 48 detects the case mark of the case number A, i.e., the case mark $m_2$ of the frame $A_1$, the content of the case mark counter coincides with the case number A (step 406), and a coincidence signal is generated from the comparator, thus stopping the microfilm F (step 407). At this time, the frame $A_1$ is located at the copying position. The flow advances to step 408 shown in FIG. 11 to check if the copy set number N is "1". If it is not "1", control enters the flow shown in FIG. 12. If N is "1", the flow advances to step 430. If $N>1$, the flow advances to step 410 shown in FIG. 12, and the microfilm is fed forward. When the case mark detector 48 detects the next case mark, i.e., the case mark $m_2$ of the starting frame $B_1$ of the next case closest to the last frame $A_2$, the microfilm is stopped (step 412). Next, the microfilm is fed backward (step 413). When the frame mark detector 47 detects a frame mark, i.e., the frame mark $m_1$ of the last frame $A_2$ of the objective case (step 414), the microfilm is stopped (step 415). At this time, the frame $A_2$ is located at the copying position. Then, the image of the frame $A_2$ is copied in step 416, and the transfer sheet S copying the frame $A_2$ is conveyed to the first bin tray $26_1$. After this copying operation is completed, the flow advances to step 417.

Upon completion of the first copying operation, the copy end signal PES is supplied to the counter 80 shown in FIG. 6, and is counted thereby. At this time, the content ("1") of the counter 80 is compared with the content of the memory 81 (storing N=2) by the comparator 82. If no coincidence is found therebetween, the sorter drive signal SDS output from the terminal b of the comparator 82 is supplied to the motor 35 of the sorter 25. In step 418, the bin trays are moved upward by one stage, thus locating the second bin tray $26_2$ at the home position.

In step 416, the frame $A_2$ is again copied, and the transfer sheet S having a copied image of the frame $A_2$ is conveyed to the second bin tray 26.

Upon completion of the second copying operation of the frame $A_2$, the content ("2") of the counter 80 coincides with the content of the memory 81 in step 417, and the flow advances to step 419.

It is checked in step 419 to determine if the sorter 25 is returned to the third home position described above. If the sorter 25 is not returned to the third home position, the flow advances to step 420, and the sorter return signal SRS output from the terminal a of the comparator 82 is supplied to the motor 35 of the sorter 25, so that the bin trays are moved downward to be located at the third home position. That is, the sheet entrance of the first bin tray $26_1$ storing the first copied transfer sheet faces the convey rollers 30 and 30'.

When the sorter 25 is returned to the third home position, the flow advances to step 421. It is checked in step 421 to determine if the case mark detector 48 detects a case mark. If the detector 48 does not detect a case mark, the flow advances to step 413.

Upon completion of the copying operation of the frame $A_2$, since a case mark has not yet been detected, the microfilm is fed backward in step 413 after the copying operation of the frame $A_2$ is completed. When a frame mark is detected in step 414, the microfilm is stopped, so that the frame $A_1$ is stopped at the copying position, and the image of the frame $A_1$ is copied. Then, the transfer sheet S having a copied image of the frame $A_1$ is conveyed to the first bin tray $26_1$.

When the first copying operation of the frame $A_1$ is completed, the second copying operation is performed via steps 417 and 418 in the same manner as described above. Thus, the transfer sheet S having a copied image of the frame $A_1$ by the second copying operation thereof is conveyed to the second bin tray $26_2$. After the second copying operation of the frame $A_1$ is completed, the sorter 25 is returned to the third home position in step 419.

The flow then advances to step 421. If the case mark detector 48 detects a case mark (detects the case mark $m_2$ of the frame A ) in step 421, the flow advances to step 422.

It is checked in step 422 to determine if the retrieval and copying operations for the input data A and B stored in the RAM of the CPU 70 are completed. If these operations are completed, the flow advances to step 423.

If it is detected in step 422 that the retrieval and copying operations of the information of the case number B are not completed, the flow returns to step 405 shown in FIG. 10, and the same operations as above are performed in steps 405 to 422. More specifically, $B-A-Y$ is calculated by the comparator in step 405, and the microfilm is fed in a predetermined direction in accordance with the calculation result. If the case mark detector 48 detects the case mark of the case number B, i.e., the case mark $m_2$ of the frame B in step 406, the content of the case mark counter coincides with the case number B, and a coincidence signal is output from the comparator, thus stopping the microfilm (step 407). At this time, the frame $B_1$ is located at the copying position.

It is checked in step 408 to determine if N=1. If $N \neq 1$, the flow advances to step 410. In step 410, the microfilm is fed forward. When the case mark detector 48 detects the case mark of the next case closest to the last frame B of the objective case, i.e., the case mark m of the frame $C_1$, the microfilm is stopped (step 412).

The microfilm is fed backward (step 413). When the frame mark detector 47 detects the frame mark m of the last frame $B_3$ (step 414), the microfilm is stopped (step 415), and the frame $B_3$ is copied (step 416).

The transfer sheet S having a copied image of the frame $B_3$ is conveyed to and stacked on the first bin tray 261.

The bin trays are moved upward by one stage (step 418), so that the sheet entrance of the second bin tray $26_2$ faces the convey rollers 30 and 30'.

Thereafter, the second copying operation of the frame $B_3$ is performed, and the transfer sheet S having a copied image of the frame $B_3$ is transferred to and stacked on the second bin tray $26_2$. The sorter 25 is returned to the first home position (steps 419 and 420).

The copying operation is repeated for the frames $B_2$ and $B_1$ to prepare an objective number of sets of copies, and the first and second bin trays $26_1$ and $26_2$ sequentially stack the transfer sheets copying the frames $B_1$ to $B_3$ in the order of pages.

When the retrieval and copying operations for the input data A and B are completed in step 422, the flow advances to step 423, thus completing the retrieval and copying operations. Thereafter, if a case number and a copy set number of a new case are input, transfer sheets can be stacked on vacant bin trays in units of cases and sets in the same manner as described above.

With the above operation, copied sheets are stacked on the first and second bin trays $26_1$ and $26_2$ of the sorter 25 as shown in the table below.

| First Bin Tray $26_1$ | $B_1$ |
|---|---|
| | $B_2$ |
| | $B_3$ |
| | $A_1$ |
| | $A_2$ |
| Second Bin Tray $26_2$ | $B_1$ |
| | $B_2$ |
| | $B_3$ |
| | $A_1$ |
| | $A_2$ |

Upon completion of the copying operations for the case numbers A and B, a set of transfer sheets (the cases A and B) is stacked on the bin tray $26_1$ or $26_2$, and they can be bound in units of sets on the bin trays, resulting in easy arrangement after the copying operation.

When an objective case is copied to prepare only a set of copies, the routine in steps 430 to 438 is performed. This routine is substantially the same as the routine in steps 410 to 422, except that the copying operation is performed once for each frame. The copies of each case are stacked on an identical bin tray.

In the above embodiments, a microfilm is used as an image carrier. However, the present invention is not limited to this. Alternatively, sheet-like documents, roll paper, and the like can be used.

Information for identifying each case is not limited to an optical mark recorded on a microfilm, but can be symbols, holes, magnetic marks, color codes, bar codes, and the like.

In the above embodiments, in a sorter, bin trays are moved. However, another method can be used. For example, while the bin trays are fixed, sheets can be distributed and conveyed to the respective bin trays.

What is claimed is:

1. An image forming apparatus used with an image carrier which has images divided into plural groups, a first mark is provided corresponding to each image, and a second mark is provided corresponding to a predetermined image of each group, comprising:
   moving means for moving the image carrier along an image reading position;
   recording means for recording onto a sheet the image carried on the image carrier located at said image reading position;
   a plurality of bins for storing the sheets recording images conveyed from said recording means;
   distribution means for distributing the sheets recording images to said bins;
   first detection means for detecting the first marks;
   second detection means for detecting the second marks;
   moving control means for actuating said moving means to stop the image carrier in accordance with an output signal from said first detection means and for moving said moving means every time recording means records the image once;
   recording control means for actuating said recording means to record the image on said image carrier onto the sheet in accordance with the output signal from said first direction means; and
   distribution control means for actuating said distribution means in accordance with the output signal from said second detection means to distribute the sheets recording images to the different bins for each of the image groups.

2. An apparatus according to claim 1, further comprising:
   sheet detection means for detecting the presence/absence of the sheet in said each bin; and wherein
   said distribution control means receives output signals from said second detection means and said sheet detection means to control said distribution means to distribute, for each of said image groups, the sheets recording images to the bins not storing the sheet.

3. An apparatus according to claim 1 further comprising:
   setting means for setting the number of times of occurrence of the image recording operation; and wherein
   said recording control means controls said recording means to record the images of the objective group onto the sheets one by one and to repeat the said recording operation the number of times set by said setting means.

4. An apparatus according to claim 1 in which:
   said distribution means includes bin moving means for moving said bins in the direction of arrangement thereof.

5. An apparatus according to claim 1 in which:
   said distribution control means controls said distribution means to distribute the sheets recording images to the bins not adjacent to each other for each of said groups.

6. An image recording apparatus used with an image carrier which has plural images divided into plural groups, a first mark is provided corresponding to each image, and a second mark is provided corresponding to a predetermined image of each group, comprising:
   moving means for moving the image carrier along an image reading position;
   recording means for recording onto a sheet the image carried on the image carrier located at said image reading position;
   a plurality of bins for storing the sheets recording images conveyed from said recording means;
   distribution means for distributing the sheets recording images to said bins;
   first detection means for detecting the first marks;
   second detection means for detecting the second marks;
   setting means for setting the number of image recording operations for the images of an objective group;
   first moving control means for actuating said moving means to stop the image carrier in accordance with an output signal from said first detection means and to move said image carrier every time said recording means records the image once;
   recording control means for actuating said recording means to record the image on said image carrier onto the sheet in accordance with the output signal from said first detection means;
   distribution control means for actuating said distribution means in accordance with the output signal from said second detection means to distribute one unit of sheets recording the images of an objective group one by one to each of said bins; and
   second moving control means for actuating said moving means to move said image carrier in accordance with the output signal from said second detection means until the number of recording operations set by said setting means are performed, and to stop said image carrier in accordance with the output signal from said first detection means.

7. An image forming apparatus comprising:

moving means for moving images divided into plural groups to an image reading position;

recording means for recording the image located on said image recording position onto sheets;

a plurality of bins for storing the sheets recording images conveyed from said recording means, said plurality of bins including at least first, second and third bins;

distribution means for distributing the sheets recording images to said bins;

detection means for detecting the presence of the sheets in each bin;

distribution control means for controlling said distribution means in accordance with an output signal from said detection means to distribute the sheets recording the images of one image group to a predetermined first bin and then distribute the sheets recording the images of another image group to said third bin adjacent to said second bin which is adjacent to said first bin.

* * * * *

UNITED STATES PATENT AND TRADEMARK OFFICE
CERTIFICATE OF CORRECTION

PATENT NO. : 4,843,432　　　　　　　　　　　　　Page 1 of 2
DATED : June 27, 1989
INVENTOR(S) : TOSHIAKI MIZUSHIMA, ET AL.

It is certified that error appears in the above-identified patent and that said Letters Patent is hereby corrected as shown below:

COLUMN 1, line 52, "in" (first occurrence) should be deleted.

COLUMN 2, line 46, "an," should read --an--.

COLUMN 13, line 39, "26" should read --$26_2$--.

COLUMN 14, line 29, "B" should read --$B_1$--;

line 39, "B" should read --$B_3$--;

line 47. "261" should read --$26_1$--.

UNITED STATES PATENT AND TRADEMARK OFFICE
CERTIFICATE OF CORRECTION

PATENT NO. : 4,843,432

DATED : June 27, 1989

INVENTOR(S) : TOSHIAKI MIZUSHIMA, ET AL.

It is certified that error appears in the above-identified patent and that said Letters Patent is hereby corrected as shown below:

COLUMN 15, line 60, "time" should read --time said--.

Signed and Sealed this

Twenty-fourth Day of April, 1990

Attest:

HARRY F. MANBECK, JR.

*Attesting Officer*      *Commissioner of Patents and Trademarks*